United States Patent [19]

Shuman et al.

[11] 3,853,844

[45] Dec. 10, 1974

[54] NUCLEOSIDE 3',5',-CYCLIC PHOSPHOROTHIOATES

[76] Inventors: Dennis A. Shuman, 26702 Estanciero, Mission Viejo, Calif. 92675; Roland K. Robins, 10050 Highcliff Rd., Santa Ana, Calif. 92705

[22] Filed: Aug. 4, 1972

[21] Appl. No.: 277,971

[52] U.S. Cl. .......................... 260/211.5 R, 424/180
[51] Int. Cl............................................ C07d 51/54
[58] Field of Search ............................ 260/211,5 R

[56] References Cited
UNITED STATES PATENTS
3,712,885   1/1973   Weimann et al............. 260/211.5 R OTHER PUBLICATIONS
Chladek et al. "Jour. Amer. Chem. Soc.," Vol. 94, 1972 pp. 2079–2081.

Primary Examiner—Johnnie R. Brown
Attorney, Agent, or Firm—Lyon & Lyon

[57] ABSTRACT

3',5'-cyclic phosphorothioates of certain 9($\beta$-D-ribofuranosyl)purine nucleosides are prepared from the corresponding 5'-deoxy-5'-iodoribosides. The compounds exhibit kinase activity in order of magnitude similar to that of the naturally occuring adenosine 3',5'-cyclic phosphate (cyclic-AMP) while the better resisting phosphodiesterase degradation. In addition, compounds prepared according to this invention have exhibited substantial specificity in inhibiting cyclic-AMP phosphodiesterase.

2 Claims, No Drawings

NUCLEOSIDE 3',5',-CYCLIC PHOSPHOROTHIOATES

BACKGROUND AND SUMMARY OF THE INVENTION

As reported by Sutherland et al in "Cyclic AMP" Am. Rev. Biochem 37, 149 (1968), cyclic adenosine monophosphate (cyclic-AMP) has been established as an intracellular "second messenger" mediating many of the actions of a variety of different hormones. According to the second messenger theory, first messenger hormones influence adenyl cyclase contained at or within cell walls to intracellularly form cyclic-AMP from adenosine triphosphate upon receipt of the extracellular hormone signal. The formed cyclic-AMP in turn stimulates intracellular functions particular to the target cells of the hormone. Cyclic-AMP has been shown to "activate" protein kinases which in turn occasion physiological effects such as muscle contraction, glycogenolysis, steroidogenisis and lipolysis. However, cyclic-AMP is degraded in vivo by phosphodiesterase enzymes which catalyze hydrolysis of the cyclic purine nucleotide to 5'-adenosine monophosphate with consequent loss of function. It would be advantageous, then, to enhance the beneficial effects of naturally produced cyclic-AMP by securing and administering phosphodiesterase inhibitors.

We have now found the 5'-deoxy 5'-thionucleoside 3',5'-cyclic phosphorothioates obtained by cyclization of 5'-deoxy-5'-thioinosine 5'-phosphorothioate [Hampton, et al Biochem 8, 2303 (1969)] and 5'-deoxy-5'-thioadenosine-5'-phosphorothioate to be potent cyclic-AMP phosphodiesterase inhibitors of surprising specificity. The compound 5'-deoxy-5'-thioguanosine 3,',5'-cyclic phosphorothioate may also be obtained according to this invention, and we fully expect the same to exhibit similar inhibitory properties when subjected to test by reason, inter alia, of its structural similarity to the corresponding inosine compound. The invention accordingly provides cyclic phosphorothioates of 9($\beta$-D-ribofuranosyl)purine nucleosides of structure

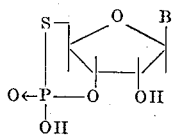

wherein B is guanine, adenine or hypoxanthine.

The cyclic phosphorothioates of the present invention differ in important respects from those few which have been reported by other contributors to the literature. Thus, F. Eckstein, J. Am. Chem. Soc. 92, 4718 (1970) prepared adenosine 3',5'-0-0-cyclic phosphorothioate, a compound in which sulfur is exocyclic and which is reported by him not to inhibit phosphodiesterase. Chladek et al, J. Am. Chem. Soc. 94, 2079 (1972) obtained 2',5'-diodeoxy-5'-thionucleoside 3',5'-cyclic phosphorthioates including one differing from the thioadenosine compound of this invention in being 2'-deoxy. The compound is not disclosed to enjoy any bioactivity, and Chladek's reaction scheme neither suggests nor admits of practicable production of 3',5'-cyclic phosphorothioates of ribosides by reason of the diverse occasions for unwanted byproduct formation to which it would be subject in that event.

DESCRIPTION OF THE PREFERRED EMBODIMENTS OF THE INVENTION

The preferred embodiments of the invention are illustrated and their advantages detailed in the examples which follow.

EXAMPLE I

5'-Deoxy-5'-thioinosine 3', 5'-cyclic phosphate

A water-methanol solution of 5'-deoxy-5'-thioinosine 5'-phosphorothioate (Hampton et al Biochem. 8, 2303 (1969)) triethylammonium salt (4.25 mmole) and 4-morpholine-N,N'-dicyclohexylcarboxamidine (1.25 g) was co-evaporated with dimethylformamide and then pyridine to a foam. The foam was dissolved in 2 liter of dry pyridine and 9 g of dicyclohexylcarbodiimide was added. The solution was refluxed for four hours, cooled and 200 ml water added. Evaporation, in vacuo, at 40°C gave a solid which was stirred in a water-ether mixture and filtered. The aqueous layer was separated, passed through a Dowex 50 ($NH_4^+$) column and diluted to two liters. The aqueous solution was added to a DEAE (triethylammonium form, 7 × 20 cm). The column was washed with 2 liters 0.02 M $Et_3NHCO_3$ and then the product was eluted with a gradient of 3 liter 0.025 M $Et_3NHCO_3$ vs. 3 liter 0.3 M $Et_3NHCO_3$. The appropriate fractions were co-evaporated with methanol and the product converted to an ammonium salt by Dowex 50 ($NH_4^+$). The yield of 5'-deoxy-5'-thioinosine 3',5'-cyclic phosphate ammonium salt was 0.224 g. The product had an electrophoretic mobility at pH 7.4 similar to inosine 3',5'-cyclic phosphate. Thin-layer chromatography of the product exhibited a single uv absorbing spot with a mobility of 1.1 relative to inosine 3',5'-cyclic phosphate (Bakerflex cellulose F, acetonitrile: 0.1 M ammonium chloride-7:3). $\lambda_{max}^{pH1}$ 249 nm ($\epsilon$9,700), $\lambda_{max}^{pH11}$ 253 nm ($\epsilon$10,800).

Anal. calcd for $C_{10}H_{14}N_5SPO_6 \cdot 2H_2O$: C, 30.07; H, 4.53; N, 17.53. Found: C, 29.69; H, 4.72; N, 17.20.

EXAMPLE II

5'-Deoxy-5-thioadenosine 3',5'-cyclic phosphorothioate

An aqueous solution (125 ml) of 5'-deoxy-5'-iodoadenosine (4.1 mmole) (W. Jahn, Chem. Ber., 98, 1705 1965) and 4 g of trilithium thiophosphate was stirred at 45°C for 5 hours. Ethanol (125 ml) was added and after one-half hour, the precipitate was removed by filtration. The filtrate was evaporated, in vacuo, at 20°C to ca. 40 ml and 25 ml of ethanol added. The resulting precipitate was filtered. The filtrate contained 5'-deoxy-5'-thioadenosine 5'-phosphorothioate which was further purified by DEAE (triethylammonium form) column chromatography. The resulting 5'-deoxy-5'-thioadenosine 5'-phosphorothioate (1 g) was dissolved in an aqueous methanolic solution containing 800 mg of 4-morpholine-N,N'-dicyclohexylcarboxamidine. The solution was co-evaporated with dimethylformamide to a foam. The foam was dissolved in 1.5 liters of pyridine containing 4 g of dicyclohexylcarbodiimide and refluxed for 2 hours. The reaction mixture was then worked-up as in the procedure for 5'-deoxy-5'-thioinosine 3',5'-cyclic phosphorothioate. The product (200 mg of ammonium salt) had an electrophoretic mobility at pH7.4 similar to adenosine 3',5'-cyclic phosphate. Thin-layer chromatography of the product exhibited a single uv absorbing spot ($\lambda max^{pH1}$ 258$_{nm}$, $\lambda max^{pH11}$ 261nm) with a mobility of 1.1 relative to adenosine 3',5'-cyclic phosphate (Bakerflex cellulose F, acetonitrile-0.1 M ammonium chloride-7:3).

The analogous 5'-deoxy-5'-thioguanosine 3',5'cyclic phosphorothioate may be obtained from 5'-0-tosylisopropylidine guanosine (W. Jahn, Chem. Ber. 98, 1705 (1965)) by reaction with sodium iodide to form the 5'-iodo-isopropylidine analog, acid hydrolysis of the isopropylidine group to afford 5'-iodo-5'-deoxyguanosine, which latter is then reacted with thiophosphate and cyclized as in Examples I and II, above.

EXAMPLE III

Activation of Cyclic-AMP dependent Protein Kinase

Cyclic-AMP dependent protein kinase was purified to the state of DEAE-cellusose chromatography from bovine brain using the procedure of Miyamoto et al, J. Biol. Chem. 244, 6395 (1969). A preparation having a specific activity of 2500 was obtained. Protein kinase activity was assayed by measuring the incorporation of P-32 phosphate into histone from $\delta$-p32 labeled ATP. The incubation mixture contained (final volume of 0.2 ml, amounts in $\mu$moles): sodium glycerol phosphate buffer, pH 6.0, 10; $\delta$-p$^{32}$-ATP about 1 × 10$^6$ cpm, .00053; magnesium acetate, 910; sodium fluoride, 2; theophylline, 0.1; EDTA, .06; histone, 500 $\mu$g; c-AMP or analog as indicated; purified protein kinase, 5-25 $\mu$g. After incubation an aliquot of the reaction mixture (0.1 ml) was transferred to discs of Whatman 3MM filter paper, air dried and washed with 6% TCA for 15 minutes at room temperature. After repeated washings with 6% TCA and finally with ether, the air-dried discs were transferred to liquid scintillation vials and radioactivity determined. One unit of protein kinase activity was defined as that amount of enzyme which will transfer 1 pmole of p$^{32}$ from $\delta$-p$^{32}$-ATP to histone in 5 minutes at 30°C. Table I compares kinase activity of the test compounds, as measured by P$^{32}$ incorporated into histone, relative to adenosine-3',5'-cyclic phosphate at various concentrations.

TABLE I

Activation of Center of Bovine Brain Protein Kinase (c-AMP dependent)

|  | Ka |
| --- | --- |
| Adenosine 3',5'-cyclic phosphate | 2.4 × 10$^{-8}$ M |
| 5'-Deoxy-5'-thioadenosine 3',5'-cyclic phosphorothioate | 5.04 × 10$^{-8}$ M |
| 5'-Deoxy-5'-thioinosine 3',5'-cyclic phosphorothioate | 2.93 × 10$^{-5}$ M |

Ka = concentration giving 50% activation.

EXAMPLE IV

Relative Hydrolysis by Rabbit Kidney Phosphodiesterase

The basic incubation mixture (final volume 1.0 ml) contained the following components (amounts in moles): Tris buffer, pH 7.50, 44; magnesium chloride 2.0; cyclic AMP or analog, 5.0; rabbit kidney 3',5-c-AMP phosphodiesterase 850 $\mu$g. After incubation for 20 minutes at 30°C, the reaction was heated at 90°C for 2.5 minutes and then cooled in ice. Crotalus atrox venom phosphodiesterase (100 $\mu$g/0.1 ml) was added and incubation continued at 30°C for 10 minutes. The reaction was terminated by the addition of 0.1 ml of cold 55% trichloroacetic acid. After addition of trichloroacetic acid, the precipitate was removed by centrifugation, and aliquots of the supernatant fluids were analyzed for inorganic phosphate colorimetrically by the ascorbic acidmolybdate method of Lowry et al, J. Biol. Chem. 162, 421 (1946). As a control, a reaction mixture was heated at 90°C. 2.5 minutes with no incubation at 30°C and no addition of venom. This phosphate value was used as a control for the interference of the analogs in the phosphate determination. As appears from Table II, the compounds of the invention proved substantially more resistant to phosphodiesterase degradation than cyclic-AMP.

TABLE II

Relative Hydrolysis of Cyclic Nucleotides by Rabbit Kidney Phosphodiesterase

|  | % Substrate Conversion |
| --- | --- |
| Adenosine 3',5'-cyclic phosphate | 100 |
| 5'-Deoxy-5'-thioadenosine 3',5'-cyclic phosphorothioate | 30 |
| 5'-Deoxy-5'-thioinosine 3',5'-cyclic phosphorothioate | <4 |

EXAMPLE V

Inhibition of Specific Cyclic-AMP-Dependent Phosphodiesterases A. Enzyme Preparation Phosphodiesterases were purified at 4°C from (a) rabbit lung, (b) rabbit kidney, (c) beef cerebral cortex, and (d) beef heart according to the following protocol. Fresh tissue was homogenized in Buffer I (0.33 M sucrose) (10 mM inidazole-HCl, pH 7.5, 10 mM magnesium acetate) for 1 minute in a Waring Blender operated at full speed. Supernatant resulting from centrifugation at 30,000 ×g for 1 hr was filtered through glass wool previously washed with Buffer I. Solid ammonium sulfate was added to 50% of saturation, the suspension was stirred for 20 minutes, and precipitate collected over 20 minutes at 20,000 ×g, then dissolved in Buffer I (10 ml per 100 ml of original homogenate) and dialyzed against a 100-fold excess of Buffer II (Buffer I without sucrose) for 18 hours. The precipitate formed during dialysis was removed by centrifugation and the clarified protein solution applied to a column of DEAE-cellulose (S and S type 70, 20 ml packed column per 100 g tissue) previously equilibrated with Buffer II. The column was eluted at 1.0 ml./min. with Buffer II until the A$_{280}$ nm of the effluent was ≤ 0.5. The column was then eluted with Buffer II containing 0.4 M KCl. All 10 ml. fractions with A$_{280}$ nm ≥ 0.2 and A$_{280}$/A$_{260}$ ≥ 1.0 were pooled and dialyzed for 18 hours against a 100-fold excess of Buffer II. The dialyzed enzyme was clarified by centrifugation and frozen at −20°C. The protein concentration varied between 1 and 2 mg/ml.

B. Inhibition of Phosphodiesterase

The reaction mixture contained (per 1.0 ml) 40$\mu$moles Tris-HCl pH 7.5, 10 $\mu$moles MgCl$_2$, 10–200 $\mu$g PDE-protein, 160 pmoles 8-[3H]-c-AMP (approx.

350,000 cpm per assay) and varying concentrations of the compounds under test.

The reaction mixture was incubated at 30°C for 10 minutes, and then heated to 90°C for 2 minutes to terminate reaction. [An identical reaction mixture was heat-killed immediately for determination of background assay radioactivity]. After cooling to room temperature, 0.1 ml of a 1 mg/ml solution of snake venom (crotalus atrox) was added to each reaction mixture and each was incubated 10 minutes at 30°C. Next, 1 ml of a 1:3 suspension of neutral, base-washed Dowex 1-X8 was added to each tube, mixed well, and centrifuged 10 min. at 1,000 rpm. 0.1 ml. supernatant from each tube was added to 3 ml. of ICN Aquascint II and the radioactivity of each assay determined in a liquid scintillation spectrometer. Reduction of the background radioactivity value from the radioactivity of the assay afforded a net counts per minute (ncpm) value. Percent inhibition at various concentrations as determined by comparing ncpm of an uninhibited control reaction mixture with ncpm of the inhibited reaction mixture. $I_{50}$ values result from a plot of % inhibition vs. log inhibitor concentration. Table III compares these values to that of a standard PDE inhibitor, theophylline.

TABLE III

| Compound | Inhibition of PDE ($\alpha$) | | | |
|---|---|---|---|---|
| | PDE Type | | | |
| | a | b | c | d |
| 5'-Deoxy-5'-thioinosine 3',5'-cyclic phosphate | 3.0 | 4.0 | 8.8 | 41 |
| 5'-Deoxy-5'-thioadenosine 3',5'-cyclic phosphate | 43 | 1.5 | 1.0 | 15 |

$\alpha = \dfrac{I_{50} \text{ theophylline}}{I_{50} \text{ test compound}}$

From the foregoing, it will be seen that the inosine and adenosine 3',5'-cyclic phosphorothioates exhibit specificity in inhibition of various phosphodiesterases. The compounds could accordingly be employed to raise cyclic-AMP levels in these tissues preferentially, while themselves exerting cyclic-AMP-like kinase activity (Example III) and the better resisting PDE hydrolysis (Example IV).

We claim:

1. 5'-deoxy-5'-thioinosine 3',5'-cyclic phosphorothioate.

2. 5'-deoxy-5-thioadenosine 3',5' cyclic phosphorothioate.

* * * * *